United States Patent
Walls

(10) Patent No.: US 8,355,442 B2
(45) Date of Patent: Jan. 15, 2013

(54) METHOD AND SYSTEM FOR AUTOMATICALLY TURNING OFF MOTION COMPENSATION WHEN MOTION VECTORS ARE INACCURATE

(75) Inventor: Frederick Walls, Norristown, PA (US)

(73) Assignee: Broadcom Corporation, Irvine, CA (US)

( * ) Notice: Subject to any disclaimer, the term of this patent is extended or adjusted under 35 U.S.C. 154(b) by 1438 days.

(21) Appl. No.: 11/936,518

(22) Filed: Nov. 7, 2007

(65) Prior Publication Data

US 2009/0115908 A1    May 7, 2009

(51) Int. Cl.
*H04N 11/02* (2006.01)
(52) U.S. Cl. .................................... 375/240.16
(58) Field of Classification Search .................. None
See application file for complete search history.

(56) References Cited

U.S. PATENT DOCUMENTS

| | | | | |
|---|---|---|---|---|
| 5,903,313 | A * | 5/1999 | Tucker et al. | 375/240.15 |
| 2004/0165662 | A1 * | 8/2004 | Battistella | 375/240.01 |
| 2006/0238650 | A1 * | 10/2006 | Wredenhagen et al. | 348/452 |
| 2007/0242748 | A1 * | 10/2007 | Mahadevan et al. | 375/240.14 |

* cited by examiner

*Primary Examiner* — Gregory Sefcheck
*Assistant Examiner* — Daniel Mitchell
(74) *Attorney, Agent, or Firm* — Thomas | Horstemeyer, LLP

(57) ABSTRACT

Certain aspects of a method and system for automatically turning off motion compensation when motion vectors are inaccurate may include determining quality of a plurality of generated motion vectors. The interpolation of a plurality of output pictures may be controlled based on the determined quality. A plurality of original input pictures may be interpolated when the determined quality of the plurality of generated motion vectors is below a threshold value. A plurality of motion compensated pictures may be interpolated when the determined quality of the plurality of generated motion vectors is above a threshold value. A reduced interpolation mode may be utilized if a generated cut-off value is less than an entry threshold value and/or above an exit threshold value.

19 Claims, 10 Drawing Sheets

METHOD AND SYSTEM FOR AUTOMATICALLY TURNING OFF MOTION COMPENSATION WHEN MOTION VECTORS ARE INACCURATE

CROSS-REFERENCE TO RELATED APPLICATIONS/INCORPORATION BY REFERENCE

None

FIELD OF THE INVENTION

Certain embodiments of the invention relate to digital video processing. More specifically, certain embodiments of the invention relate to a method and system for automatically turning off motion compensation when motion vectors are inaccurate.

BACKGROUND OF THE INVENTION

A major revolution in video display technology includes flat screens based on either liquid crystal display (LCD) or plasma display panel (PDP) technology that are rapidly replacing the cathode ray tube (CRT) technology that served as the primary display device for more than a half a century. A significant consequence of the new video display technologies is that pictures may now be displayed at higher picture-rates with progressive scanning on a flat screen. The new video display technologies may also facilitate a faster transition from standard definition television (SDTV) to high-definition television (HDTV). However, legacy video compression systems still use formats with lower picture-rates and may be unable to optimally display legacy video on modern display screens.

An artifact known as "motion judder" may occur when the picture rate of a video sequence is excessively low. Motion judder may occur when the temporal sampling rate is too low to describe motion in a scene. The objects in input pictures may be shifted on either side of a required output picture. A temporal digital filter interpolation method may be used to determine pixel intensity values. The signals describing motion of each of the objects within a scene may be referred to as motion vectors. Each pixel or region with the same movement may be allocated a motion vector. The motion estimation system may determine these motion vectors and failing to find a correct motion vector and/or misusing the motion vector in a picture rate converter may lead to noticeable artifacts. When large camera movements occur, regions of a picture close to the borders may have significantly less reliable motion vectors than those closer to the middle and special processing may be required at the picture boundaries.

Telecine is a process that may be used to transfer film sequences to television. Telecine may involve a vertical low-pass Kell-factor filtering of a source image followed by a frame-rate conversion through field repetition. For NTSC, the first 3 fields may be received from the first film frame, followed by 2 fields from the second film frame, followed by 3 fields from the third film frame and so on. The non-uniformity of frames may cause motion judder. In cases where the telecine transfer maps the same number of fields to a single frame, a blurring or stuttering phenomenon may be present because of low temporal resolution of the source images and the near-simultaneous display of two temporally-disparate images.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for automatically turning off motion compensation when motion vectors are inaccurate, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the invention may be found in a system and/or method for automatically turning off motion compensation when motion vectors are inaccurate. Certain aspects of a method may comprise determining quality of a plurality of generated motion vectors. The interpolation of a plurality of output pictures may be controlled based on the determined quality. A plurality of original input pictures may be interpolated when the determined quality of the plurality of generated motion vectors is below a threshold value. A plurality of motion compensated pictures may be interpolated when the determined quality of the plurality of generated motion vectors is above a threshold value.

A motion vector may be selected from a plurality of generated forward, backward and pivot pixel motion vectors based on a calculated cost of performing motion compensation along each of the plurality of generated motion vectors. A plurality of motion compensated pixels corresponding to the selected motion vector may be selected and a plurality of interpolated pictures may be generated based on a calculated difference between the selected plurality of motion compensated pixels. A plurality of output pictures may be generated based on filtering a generated shut-off value, the generated plurality of interpolated pictures and a repeated pixel value. The shut-off value may be generated based on comparison of the calculated difference with one or more cut-off threshold values. A reduced interpolation mode may be utilized in instances where a generated cut-off value may be less than an entry threshold value and/or above an exit threshold value.

Figure 1:
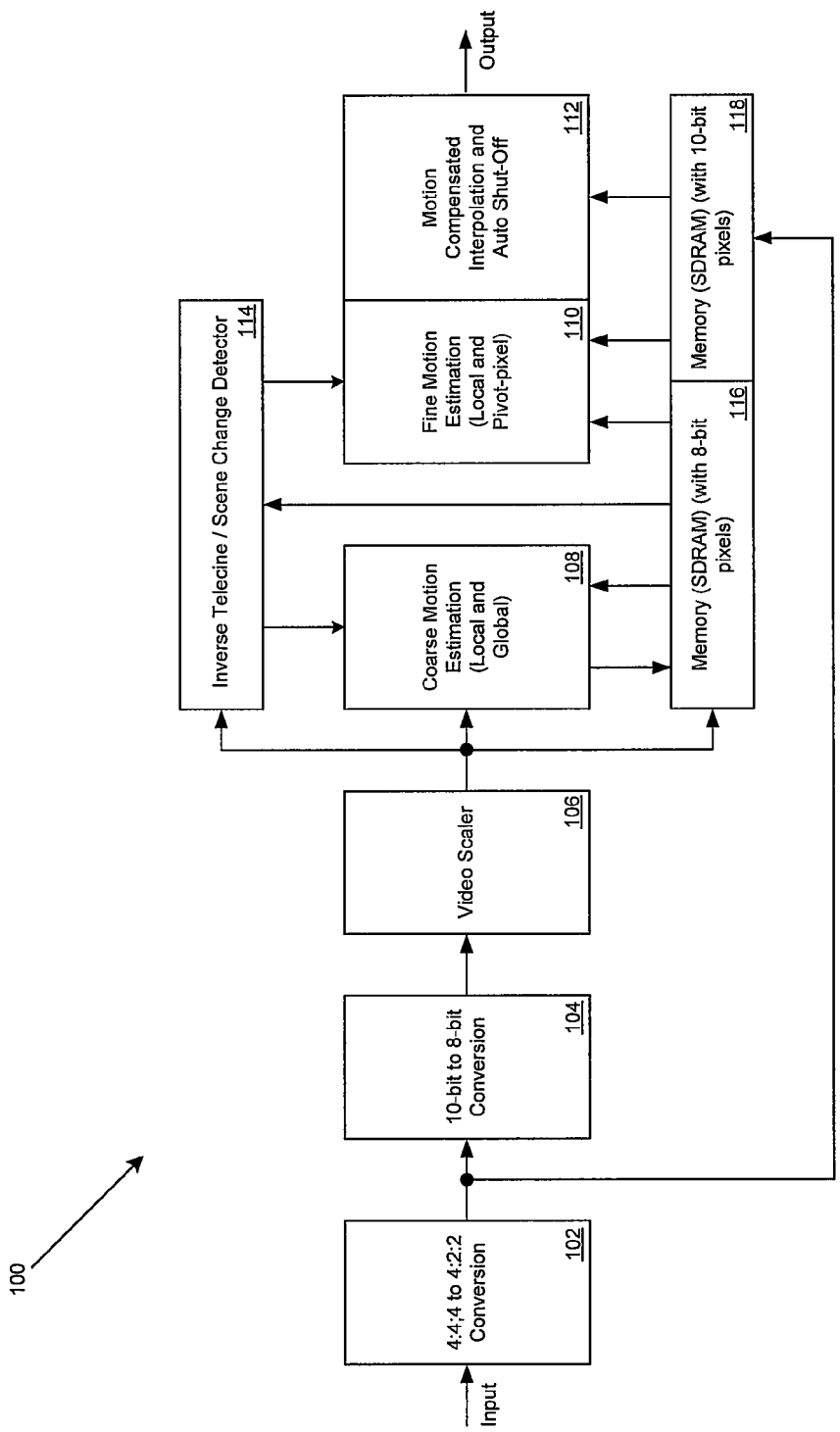
FIG. 1 is a block diagram of an exemplary motion judder cancellation system, in accordance with an embodiment of the invention.

FIG. 1 is a block diagram of an exemplary motion judder cancellation system, in accordance with an embodiment of the invention. Referring to FIG. 1, there is shown a motion judder cancellation system 100. The motion judder cancellation system 100 may comprise a video conversion block 102, a bit conversion block 104, a video scaler 106, a coarse motion estimation block 108, a fine motion estimation block 110, a motion compensated interpolation and auto shut-off block 112, an inverse telecine block 114, a memory portion with 8-bit pixels 116 and a memory portion with 10-bit pixels 118.

The video conversion block 102 may comprise suitable logic, circuitry and/or code that may be enabled to convert the received video in 4:4:4 format to 4:2:2 format. The bit conversion block 104 may comprise suitable logic, circuitry and/or code that may be enabled to convert received 10-bit video data to 8-bit video data, for example. The video scaler 106 may comprise suitable logic, circuitry and/or code that may be enabled to scale the received 8-bit video data by modifying the resolution of the received video data and generate a scaled video output to the inverse telecine block 114, the coarse motion estimation block 108 and the memory portion with 8-bit pixels 116.

The inverse telecine block 114 may comprise suitable logic, circuitry and/or code that may be enabled to detect a cadence with 3:2 pulldown and perform motion estimation on the received picture. The inverse telecine block 114 may be enabled to detect scene changes in the received video pictures and determine whether to repeat pictures for the duration of the scene change. The inverse telecine block 114 may be enabled to create a meta-data descriptor associated with each video field. The meta-data descriptor may comprise information that may be necessary for firmware and/or software to make correct decisions of field pairing to form frames, for example, interlaced or progressive coding of frames, and telecine patterns.

The memory region with 8-bit pixels 116 may comprise suitable logic, circuitry and/or code that may be enabled to receive and store the scaled video input and the generated local and global motion vectors. The memory region with 8-bit pixels 116 may comprise suitable logic, circuitry and/or code that may be enabled to output the generated local and global motion vectors to the inverse telecine block 114 and the fine motion estimation block 110. The memory region with 10-bit pixels 118 may comprise suitable logic, circuitry and/or code that may be enabled to receive and store the converted input video. The memory region with 10-bit pixels 118 may be enabled to output the converted input video to the fine motion estimation block 110 and the motion compensated interpolation and auto shut-off block 112.

The coarse motion estimation block 108 may comprise suitable logic, circuitry and/or code that may be enabled to generate block motion vectors and a global motion vector and determine the interpolation and filtering modes based on the received scaled input pictures. The coarse motion estimation block 108 may be enabled to accumulate the plurality of block motion vectors in order to estimate a global motion vector (GMV). The coarse motion estimation block 108 may be enabled to sort motion vectors into a histogram and generate the GMV.

The input video data may be a video sequence at a picture rate of X Hz, for example. The output generated may be a video sequence at a picture rate of Y Hz, for example, where $Y \geq X$ and Y may match the display picture rate. The coarse motion estimation block 108 may be enabled to utilize a motion vector search algorithm to track motion of objects from one picture to the next picture. The coarse motion estimation block 108 may be enabled to split local and global motion search functions in order to generate candidate motion vectors and their corresponding cost measures.

In accordance with an embodiment of the invention, if a picture does not correspond to a scene change, each block in the picture may be associated with a local motion vector ($v_x$, $v_y$). These local motion vectors, which may have sub-pixel resolution, may be combined together to build a vector field. The local motion search function may determine the forward and backward motion vectors for a given block location, where each vector may have a corresponding cost, for example, sum of absolute differences (SAD). Notwithstanding, the block size for motion estimation may vary, for example, 4×4 or 8×8.

For example, in a scene where a camera follows an airplane flying over a cloudy sky. The global motion may comprise a pan of the camera as it follows the airplane, and the airplane itself may be the object where motion may differ from global motion. A global motion vector may be derived based on a measure of global motion by collecting statistics, for example, a histogram of local motion vectors. Alternatively, the global motion vector may be approximated based on a pixel transformation, such as:

$$v_x = a_{11}x + a_{12}y + b_1$$

$$v_y = a_{21}x + a_{22}y + b_2$$

where (x, y) and ($v_x$, $v_y$) may indicate the position and motion, respectively. The parameters $a_{11}$, $a_{12}$, $b_1$ and $a_{21}$, $a_{22}$, $b_2$ may be estimated by local motion vector samples using a least squares method, for example.

The fine motion estimation block 110 may comprise suitable logic, circuitry and/or code that may be enabled to refine the motion vectors extracted from the received video stream and decompose the block motion vectors into pixel motion vectors. The fine motion estimation block 110 may be enabled to perform a local refinement search and the motion vectors may be refined to sub-pixel precision, for example. The fine motion estimation block 110 may be enabled to accumulate the plurality of block motion vectors in order to estimate a global motion vector (GMV). The fine motion estimation block 110 may be enabled to sort motion vectors into a histogram and generate the GMV.

The motion compensated interpolation and auto shut-off block 112 may comprise suitable logic, circuitry and/or code that may be enabled to utilize the scaled local and global motion vectors and the decoded and/or received pictures to generate the interpolated or inserted pictures. The motion compensated interpolation and auto shut-off block 112 may be enabled to generate a plurality of output pictures based on filtering a generated shut-off value, the generated plurality of interpolated pictures and a repeated pixel value. The shut-off value may be generated based on comparison of the calculated difference with one or more cut-off threshold values. A reduced interpolation mode may be utilized if a generated cut-off value is less than an entry threshold value and/or above an exit threshold value. The cut-off value may be generated based on comparison of the calculated difference with one or more threshold values.

Figure 2:
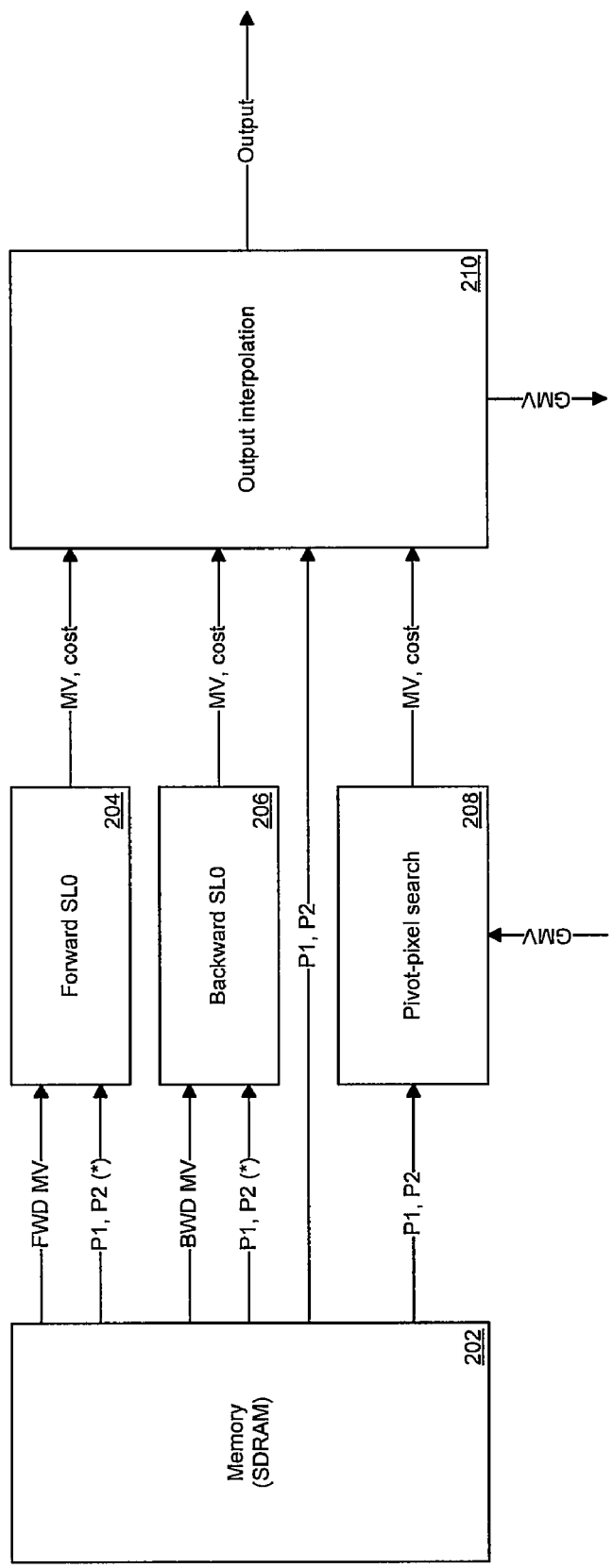
FIG. 2 is a block diagram of an output stage of an exemplary motion judder cancellation system, in accordance with an embodiment of the invention.

FIG. 2 is a block diagram of an output stage of an exemplary motion judder cancellation system, in accordance with an embodiment of the invention. Referring to FIG. 2, there is shown a memory 202, a forward search level 0 block 204, a backward search level 0 block 206, a pivot pixel search block 208 and an output interpolation block 210.

The memory 202 may comprise suitable logic, circuitry and/or code that may be enabled to output a plurality of generated forward motion vectors and their corresponding previous and next pictures, P1 and P2 respectively to the forward search level 0 block 204. The memory 202 may be enabled to output a plurality of backward motion vectors and their corresponding previous and next pictures, P1 and P2 respectively to the backward search level 0 block 206. The memory 202 may be enabled to output the previous and next pictures, P1 and P2 respectively to the pivot pixel search block 206 and the output interpolation block 210.

The forward search level 0 block 204 may comprise suitable logic, circuitry and/or code that may be enabled to receive generated forward motion vectors and calculate a cost of performing motion compensation of a particular block or pixel along the generated forward motion vectors and output the generated forward motion vectors and the corresponding costs to the output interpolation block 210.

The backward search level 0 block 206 may comprise suitable logic, circuitry and/or code that may be enabled to receive generated backward motion vectors and calculate a cost of performing motion compensation of a particular block or pixel along the generated backward motion vectors and output the generated backward motion vectors and the corresponding costs to the output interpolation block 210.

The pivot pixel search block 208 may comprise suitable logic, circuitry and/or code that may be enabled to receive the previous and next pictures, P1 and P2 respectively and a generated global motion vector (GMV) from the coarse motion estimation block 108, for example, and generate a pivot pixel motion vector. The pivot pixel search block 208 may be enabled to calculate a cost of performing motion compensation of a particular block or pixel along the generated pivot pixel motion vector and output the generated pivot pixel motion vector and the corresponding costs to the output interpolation block 210.

The output interpolation block 210 may comprise suitable logic, circuitry and/or code that may be enabled to determine quality of a plurality of generated motion vectors, for example, forward, backward and pivot pixel motion vectors FSL0 MV, BSL0 MV and PIVPIX MV respectively. The output interpolation block 210 may be enabled to control the interpolation of a plurality of output pictures based on the determined quality. The output interpolation block 210 may be enabled to interpolate a plurality of original input pictures when the determined quality of the plurality of generated motion vectors is below a threshold value. The output interpolation block 210 may be enabled to interpolate a plurality of motion compensated pictures when the determined quality of the plurality of generated motion vectors is above a threshold value.

The output interpolation block 210 may be enabled to receive the generated forward, backward and pivot pixel motion vectors and the corresponding costs associated with performing motion compensation of a particular block or pixel along the generated motion vectors. The output interpolation block 210 may be enabled to select a motion vector from the plurality of generated forward, backward and pivot pixel motion vectors based on the least calculated cost of performing motion compensation along each of the plurality of generated motion vectors. The output interpolation block 210 may be enabled to select a plurality of motion compensated pixels corresponding to the selected motion vector. The output interpolation block 210 may be enabled to generate a plurality of interpolated pictures and a global motion vector based on a calculated difference between the selected plurality of motion compensated pixels. The output interpolation block 210 may be enabled to generate a plurality of output pictures based on filtering a generated shut-off value, the generated plurality of interpolated pictures and a repeated pixel value. The shut-off value may be generated based on comparison of the calculated difference with one or more cut-off threshold values. A reduced interpolation mode may be utilized in instances where a generated cut-off value may be less than an entry threshold value and/or above an exit threshold value.

Figure 3:
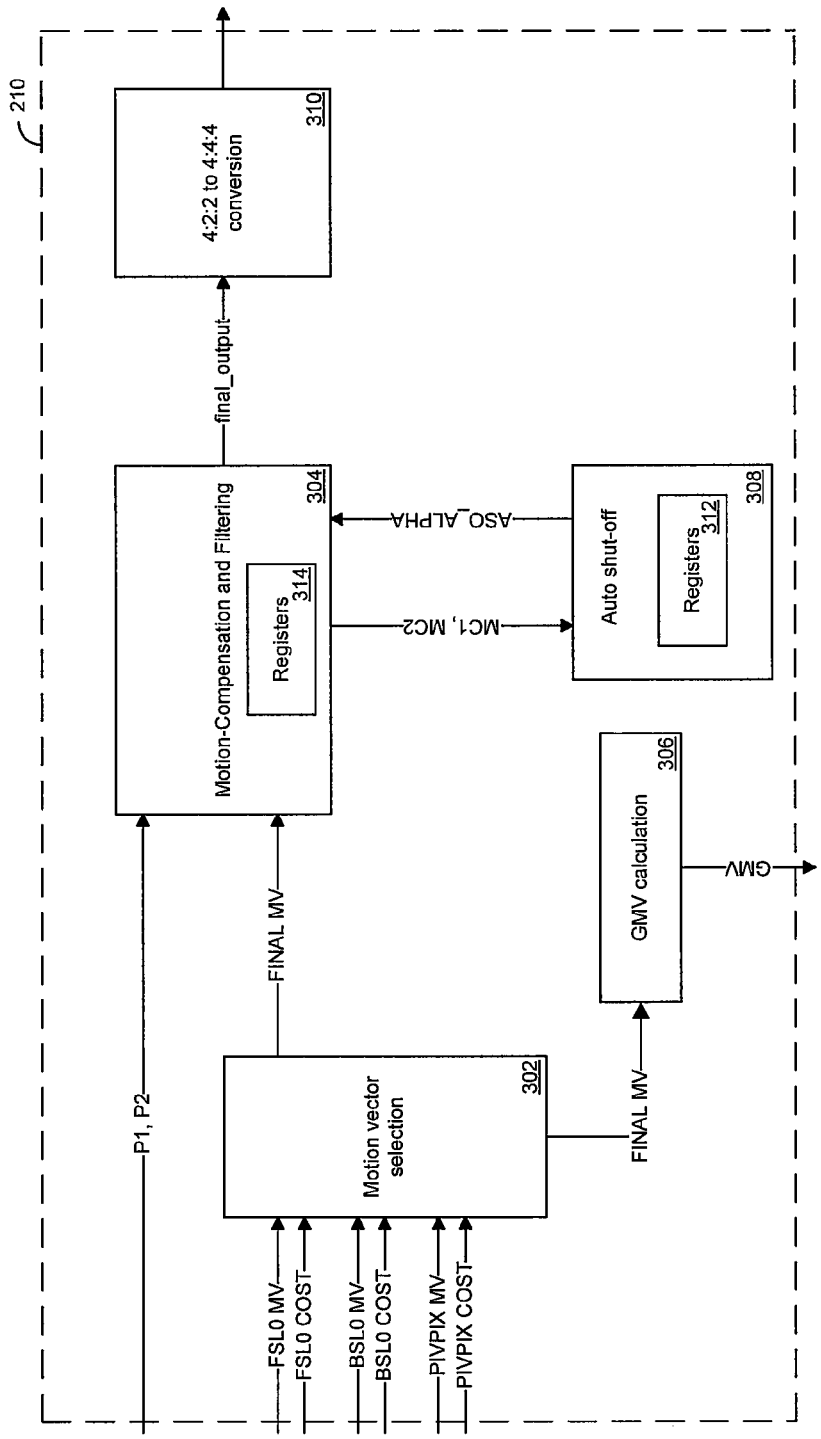
FIG. 3 is a block diagram of output interpolation of an exemplary motion judder cancellation system, in accordance with an embodiment of the invention.

FIG. 3 is a block diagram of output interpolation of an exemplary motion judder cancellation system, in accordance with an embodiment of the invention. Referring to FIG. 3, there is shown the output interpolation block 210. The output interpolation block 210 may comprise a motion vector selection block 302, a motion compensation and filtering block 304, a GMV calculation block 306, an auto shut-off block 308 and a video conversion block 310. The motion compensation and filtering block 304 may comprise a registers block 314. The auto shut-off block 308 may comprise a registers block 312.

The motion vector selection block 302 may comprise suitable logic, circuitry and/or code that may be enabled to receive the generated forward, backward and pivot pixel motion vectors FSL0 MV, BSL0 MV and PIVPIX MV respectively and the corresponding costs associated with performing motion compensation of a particular block or pixel along the generated motion vectors FSL0 cost, BSL0 cost and PIVPIX cost respectively. The motion vector selection block 302 may be enabled to select a motion vector from the plurality of generated forward, backward and pivot pixel motion vectors FSL0 MV, BSL0 MV and PIVPIX MV respectively based on the least calculated cost of performing motion compensation along each of the plurality of generated motion vectors. The motion vector selection block 302 may be enabled to output the selected motion vector to the GMV calculation block 306 and the motion compensation and filtering block 304.

The GMV calculation block 306 may comprise suitable logic, circuitry and/or code that may be enabled to generate the global motion vector to the pivot pixel search block 208 based on the selected motion vector.

The motion compensation and filtering block 304 may comprise suitable logic, circuitry and/or code that may be enabled to select a plurality of motion compensated pixels, MC1 and MC2 corresponding to the selected motion vector. The motion compensation and filtering block 304 may be enabled to generate a plurality of interpolated pictures based on a calculated difference between the selected plurality of motion compensated pixels. The registers block 314 may be enabled to store a plurality of threshold values.

The auto shut-off block 308 may comprise suitable logic, circuitry and/or code that may be enabled to receive the selected plurality of motion compensated pixels, MC1 and MC2 corresponding to the selected motion vector and calculate a difference, |diff| between the selected plurality of motion compensated pixels, MC1 and MC2.

The auto shut-off block 308 may be enabled to generate a histogram over a particular number of pixels comprising a plurality of threshold values based on the calculated difference, |diff| between the selected plurality of motion compensated pixels, MC1 and MC2. The registers block 312 may comprise suitable logic, circuitry and/or code that may be enabled to store a plurality of threshold values, MC_HISTOGRAM_THRESH_0, MC_HISTOGRAM_THRESH_1, MC_HISTOGRAM_THRESH_2, MC_HISTOGRAM_THRESH_3 and MC_HISTOGRAM_THRESH_4 that may be adjustable or programmable based on the calculated difference, |diff| between the selected plurality of motion compensated pixels, MC1 and MC2. The calculated difference, |diff| may be ignored when $0 \leq |diff| < MC\_HISTOGRAM\_THRESH\_0$.

Table 1 illustrates exemplary allocation of the calculated difference, |diff| between the selected plurality of motion compensated pixels, MC1 and MC2 to a corresponding bin based on a plurality of threshold values.

TABLE 1

| | |
|---|---|
| Bin0 | MC_HISTOGRAM_THRESH_0 ≦ |diff| < MC_HISTOGRAM_THRESH_1 |
| Bin1 | MC_HISTOGRAM_THRESH_1 ≦ |diff| < MC_HISTOGRAM_THRESH_2 |
| Bin2 | MC_HISTOGRAM_THRESH_2 ≦ |diff| < MC_HISTOGRAM_THRESH_3 |
| Bin3 | MC_HISTOGRAM_THRESH_3 ≦ |diff| < MC_HISTOGRAM_THRESH_4 |
| Bin4 | MC_HISTOGRAM_THRESH_4 ≦ |diff| |

The generated histogram may be reset after the statistics are read and new statistics may be gathered for a next group of lines and/or pixels. A histogram cut-off value, aso_unexpected may be generated based on the generated histogram according to the following equation:

$$aso\_unexpected = Bin0 + 2*Bin1 + 4*Bin2 + 8*Bin3 + 16*Bin4$$

A shut-off value, aso_alpha may be generated based on comparison of the generated histogram cut-off value, aso_unexpected with one or more cut-off threshold values. The shut-off value may be constrained to be within 0 and 1024, for example, so as to achieve a blend that may be between 0 and 100%.

Table 2 illustrates allocation of the generated histogram cut-off value, aso_unexpected to a corresponding shut-off value, aso_alpha based on a plurality of threshold values.

TABLE 2

| | |
|---|---|
| aso_alpha + 4 | 0 ≦ aso_unexpected < AINC4_THRESH |
| aso_alpha + 2 | AINC4_THRESH ≦ aso_unexpected < AINC2_THRESH |
| aso_alpha + 1 | AINC2_THRESH ≦ aso_unexpected < AINC1_THRESH |
| aso_alpha | AINC1_THRESH ≦ aso_unexpected < ADEC1_THRESH |
| aso_alpha − 1 | ADEC1_THRESH < aso_unexpected ≦ ADEC2_THRESH |
| aso_alpha − 2 | ADEC2_THRESH < aso_unexpected ≦ ADEC4_THRESH |
| aso_alpha − 4 | ADEC4_THRESH < aso_unexpected ≦ ADEC8_THRESH |
| aso_alpha − 8 | ADEC8_THRESH < aso_unexpected ≦ ADEC16_THRESH |
| aso_alpha − 16 | ADEC16_THRESH < aso_unexpected ≦ ADEC32_THRESH |
| aso_alpha − 32 | ADEC32_THRESH < aso_unexpected |

The auto shut-off block 308 may be enabled to output the generated shut-off value, aso_alpha to the motion compensation and filtering block 304. The motion compensation and filtering block 304 may be enabled to generate a plurality of output pictures based on filtering the generated shut-off value, aso_alpha, the generated plurality of interpolated pictures and a repeated pixel value.

The video conversion block 310 may comprise suitable logic, circuitry and/or code that may be enabled to convert the generated output video pictures in 4:2:2 format to 4:4:4 format.

Figure 4A:
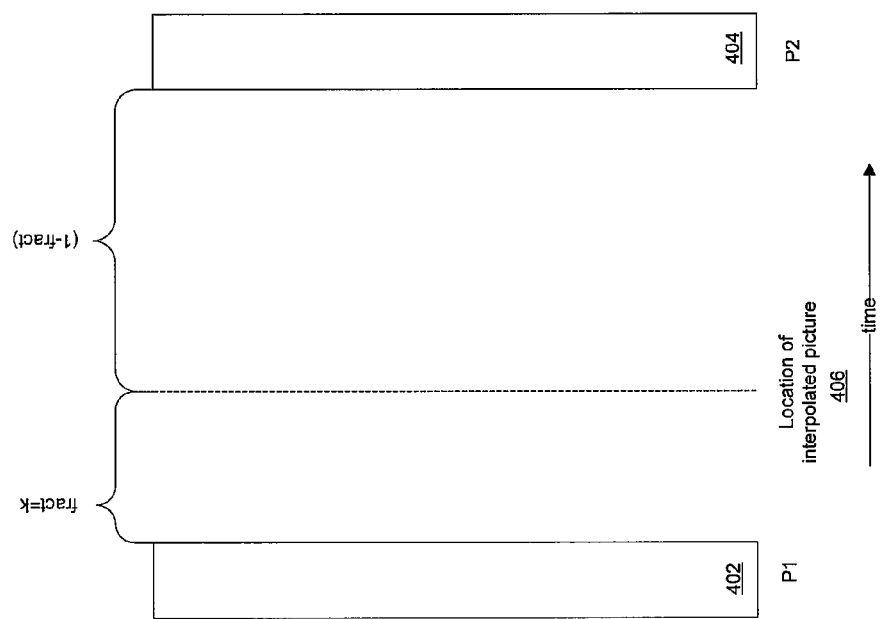
FIG. 4A is a block diagram illustrating insertion of an exemplary interpolated picture between two pictures, in accordance with an embodiment of the invention.

FIG. 4A is a block diagram illustrating insertion of an exemplary interpolated picture between two pictures, in accordance with an embodiment of the invention. Referring to FIG. 4A, there is shown a plurality of coded pictures, for example, P1 402 and P2 404 and the location of an interpolated picture 406. For example, the interpolated picture 406 may be inserted k time units from the coded picture P1 402.

Figure 4B:
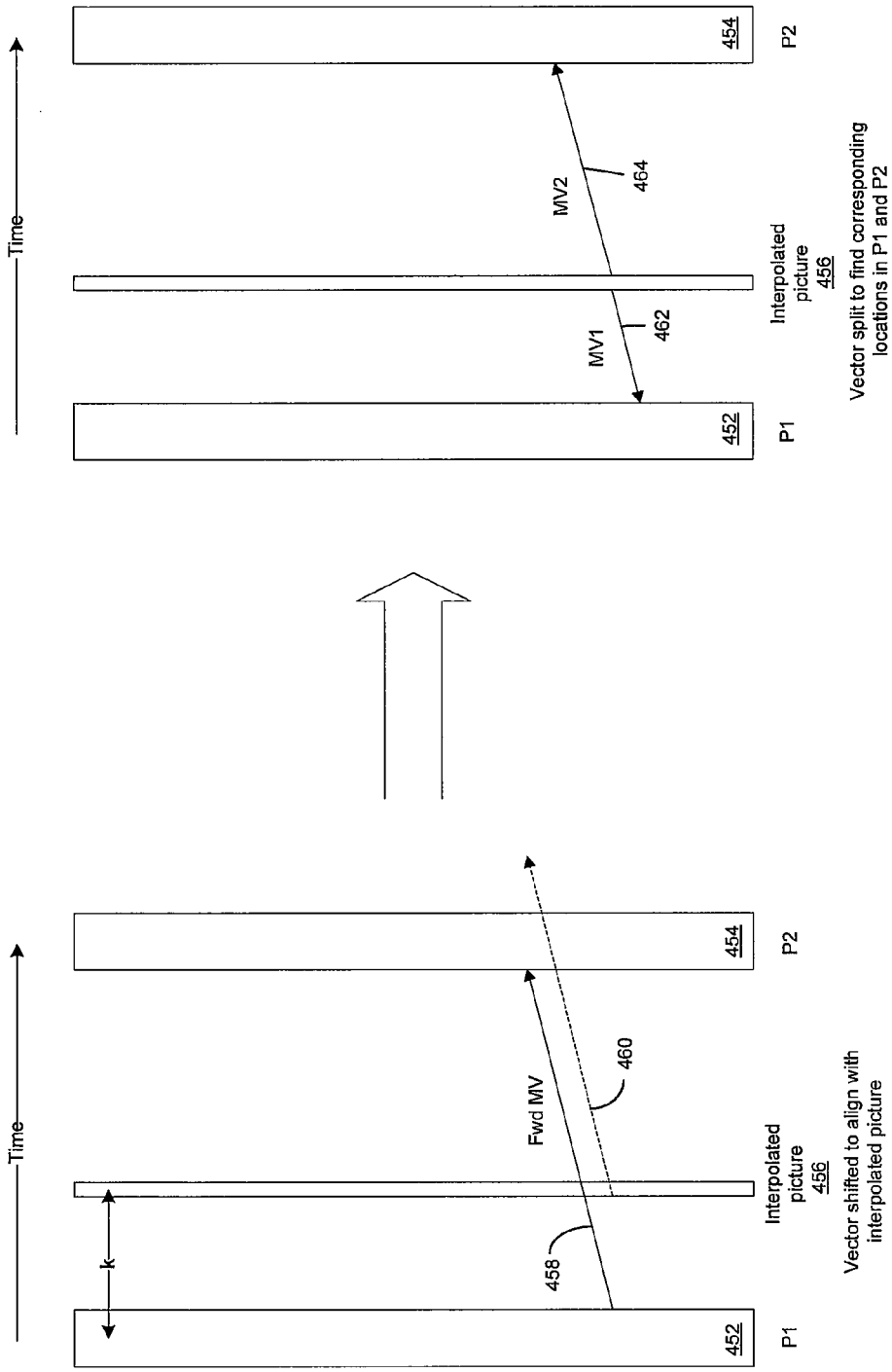
FIG. 4B is a block diagram illustrating exemplary motion vectors of an interpolated picture, in accordance with an embodiment of the invention.

FIG. 4B is a block diagram illustrating exemplary motion vectors of an interpolated picture, in accordance with an embodiment of the invention. Referring to FIG. 4B, there is shown a plurality of coded pictures, for example, P1 452 and P2 454 and an interpolated picture 456. For example, the interpolated picture 456 may be inserted k time units from the coded picture P1 452.

A motion vector 458 may point from an area in the previous picture P1 452 to an area in the next picture P2 454, in such a way that the motion vector 458 may capture the motion that occurred between the two original pictures P1 452 and P2 454. The motion vector 460 may be a shifted version of motion vector 458. The motion vector 460 may be shifted to align with the interpolated picture 456.

The motion vector 460 may be split into two motion vectors, for example, MV1 462 and MV2 464. Each of the estimated motion vectors, for example, motion vector 460 may be split and scaled for motion compensated interpolation. The directions of the two scaled motion vectors, for example, MV1 462 and MV2 464 may be opposite to each other. The length of the scaled motion vector, for example, MV1 462 may be proportional to the temporal difference between the interpolated picture 456 and the original picture P1 452. The length of the scaled motion vector, for example, MV2 464 may be proportional to the temporal difference between the interpolated picture 456 and the original picture P2 454.

Figure 5:
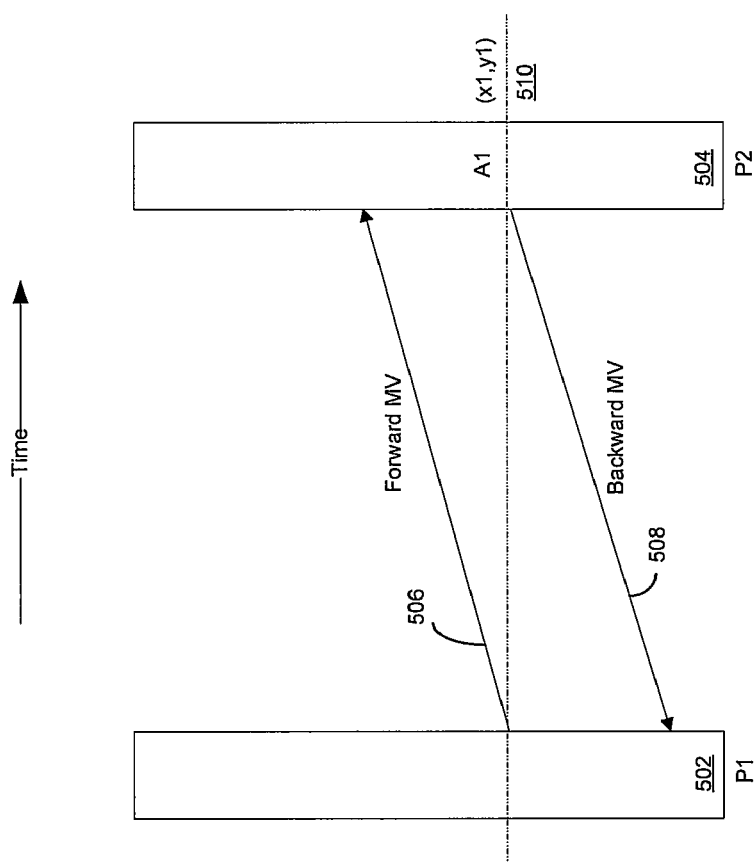
FIG. 5 is a block diagram illustrating exemplary forward and backward motion vectors corresponding to a block using adjacent pictures, in accordance with an embodiment of the invention.

FIG. 5 is a block diagram illustrating exemplary forward and backward motion vectors corresponding to a block using adjacent pictures, in accordance with an embodiment of the invention. Referring to FIG. 5, there is shown a plurality of adjacent original pictures, for example, P1 502 and P2 504, a forward motion vector 506 corresponding to pixel A1 (x1, y1) 510 and a backward motion vector corresponding to pixel A1 (x1, y1) 510. In accordance with an embodiment of the invention, a spatial horizontal dimension may extend out of the page.

The coarse motion estimation block 108 may be enabled to generate the forward motion vector 506 and the backward motion vector 508. The forward search level 0 block 204 and the backward search level 0 block 206 may be enabled to calculate a cost of performing motion compensation of a particular pixel, for example, A1 510 along the generated forward motion vector 506 and the generated backward motion vector 508 corresponding to the particular pixel A1 510 respectively. The motion vector with the least cost may be selected.

In accordance with an embodiment of the invention, when video is recorded using a moving camera, the regions of a picture close to its borders may have less reliable motion vectors than those closer to the middle of the region. In instances where an object appears in a scene that may not be seen in the previous picture P1 502, it may be difficult to find a reference for the backward motion vector 508 in the previous picture P1 502. Similarly, if an object disappears from a scene and may not be seen in a next picture P2 504, it may be difficult to find a reference for the forward motion vector 656 in the next picture P2 504.

Figure 6:
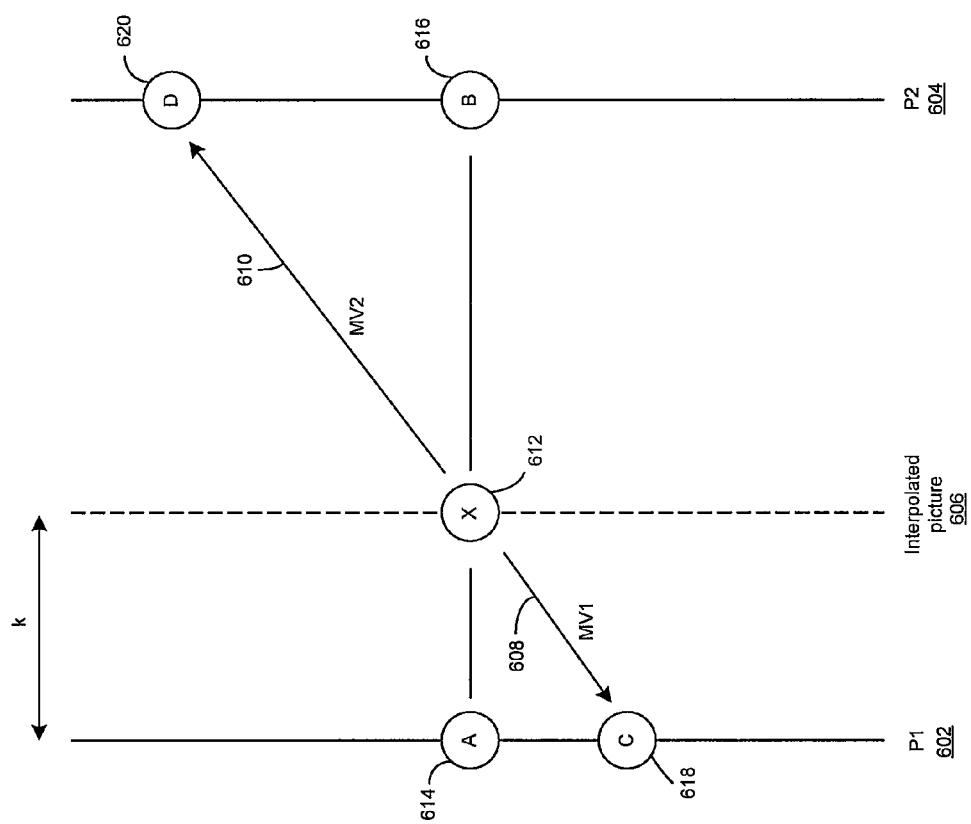
FIG. 6 is a block diagram illustrating exemplary motion-compensated forward and backward motion vectors corresponding to a block using adjacent pictures, in accordance with an embodiment of the invention.

FIG. 6 is a block diagram illustrating exemplary motion-compensated forward and backward motion vectors corresponding to a block using adjacent pictures, in accordance with an embodiment of the invention. Referring to FIG. 6, there is shown a plurality of pictures, for example, P1 602 and P2 604 and an interpolated picture 606.

The coarse motion estimation block 108 and the fine motion estimation block 110 may be enabled to perform bi-directional motion estimation and select the motion vector with the least cost measurement for a given block or pixel position (x, y). The selected forward motion vector 506 may be forward and backward projected onto adjacent pictures P1 602 and P2 604 using a fraction value fract=k to generate a plurality of motion vectors in sub-pel resolution. For example, the motion vector MV2 610 may be generated according to the following equations:

$$mv2\_x = (1-k)*fwd\_mv\_x \text{ and } mv2\_y = (1-k)*fwd\_mv\_y,$$

where fwd_mv_x and fwd_mv_y may represent x and y components of the selected forward motion vector 506 respectively. Similarly, the motion vector MV1 608 may be generated according to the following equations:

$$mv1\_x = mv2\_x - fwd\_mv\_x \text{ and } mv1\_y = mv2\_y - fwd\_mv\_y.$$

The motion compensation and filtering block 304 may be enabled to perform motion compensation at each pixel location. The current pixel (x, y) may be indicated by pixel X 612 in the interpolated picture 606. The pixel A 614 may indicate a non-motion compensated pixel from previous picture P1 602. The pixel B 616 may indicate a non-motion compensated pixel from next picture P2 604. The pixel C 618 may indicate the motion compensated pixel with sub-pixel resolution from previous picture P1 602. The pixel C 618 may be represented as:

$$PIX\_C = P1(x+mv1\_x, y+mv1\_y)$$

where mv1_x and mv1_y may indicate x and y components of MV1 608. The pixel D 620 may indicate the motion compensated pixel with sub-pixel resolution from next picture P2 604. The pixel D 620 may be represented as:

$$PIX\_D = P2(x+mv2\_x, y+mv2\_y)$$

where mv2_x and mv2_y may indicate x and y components of MV2 610.

The pixel X 612 may be generated at the boundary regions using one of pixel C 618 and pixel D 620. If the forward motion vector 506 is selected, pixel D 620 may be used for predicting pixel X 612. If the backward motion vector 508 is selected, pixel C 618 may be used for predicting pixel X 612.

Figure 7:
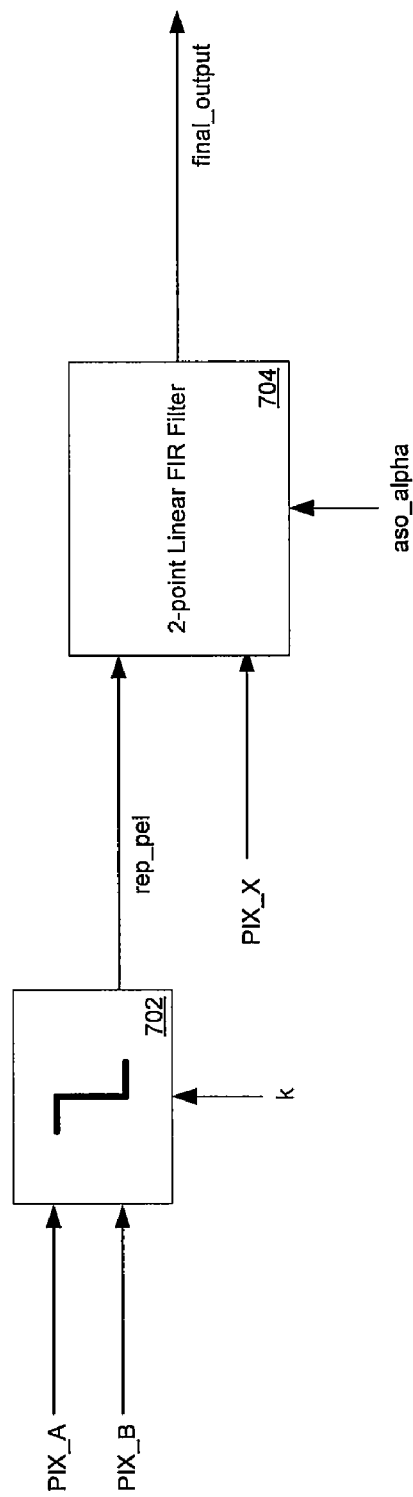
FIG. 7 is a block diagram illustrating auto shutoff operation in an exemplary motion judder cancellation system, in accordance with an embodiment of the invention.

FIG. 7 is a block diagram illustrating auto shutoff operation in an exemplary motion judder cancellation system, in accordance with an embodiment of the invention. Referring to FIG. 7, there is shown a selector 702 and a filter 704.

The selector 702 may comprise suitable logic, circuitry and/or code that may be enabled to receive a non-motion compensated pixel, PIX_A 614 from a previous picture P1 602 and a non-motion compensated pixel, P1X_B 616 from a next picture P2 604 and a fract value k indicating a distance between the previous picture P1 602 and the generated interpolated picture 606.

A repeated pixel value, rep_pel may be generated and may be equal to the non-motion compensated pixel, PIX_A 614 from the previous picture P1 602 when a distance or fract value k between the previous picture P1 602 and the generated interpolated picture 606 may be less than a fractional threshold value, for example, k<0.5. The generated repeated pixel value, rep_pel may be equal to a non-motion compensated pixel, PIX_B 616 from the next picture P2 604 when a distance or fract value k between the previous picture P1 602 and the generated interpolated picture 606 is not less than the fractional threshold value, for example, k≧0.5.

The filter 704 may comprise suitable logic, circuitry and/or code that may be enabled to receive the generated repeated pixel value, rep_pel and the generated interpolated picture 606, for example, PIX_X 612 and the generated shut-off value, aso_alpha. The filter 704 may be enabled to generate a plurality of output pictures based on filtering the generated shut-off value, aso_alpha, the generated plurality of interpolated pictures and the repeated pixel value, rep_pel according to the following equation:

$$\text{final\_output} = ((aso\_alpha \gg 2)*PIX\_X + (256-(aso\_alpha \gg 2))*rep\_pel) \gg 8,$$

where final_output is the generated output picture for each Y, Cb, or Cr component.

Figure 8:
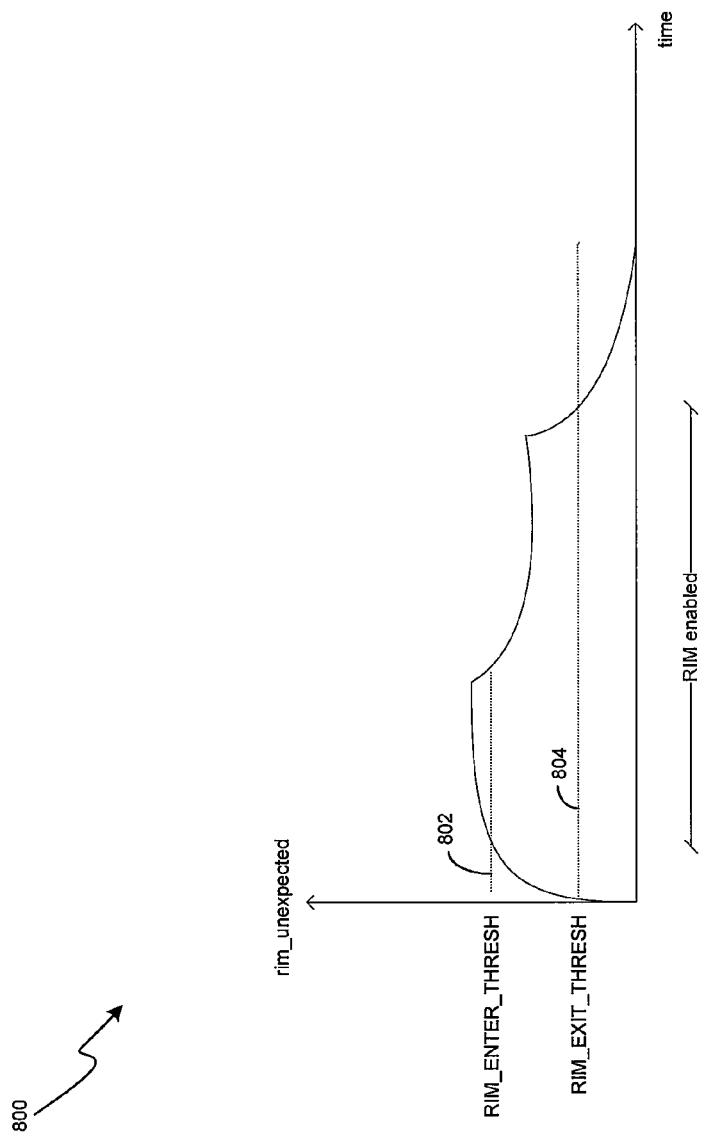
FIG. 8 is a block diagram illustrating a reduced interpolation mode in an exemplary motion judder cancellation system, in accordance with an embodiment of the invention.

FIG. 8 is a block diagram illustrating a reduced interpolation mode in an exemplary motion judder cancellation system, in accordance with an embodiment of the invention. Referring to FIG. 8, there is shown a graph 800. The graph 800 illustrates the value of a generated cut-off value, rim_unexpected over time.

The cut-off value, rim_unexpected may be generated based on the generated histogram similar to the generation of the histogram cut-off value, aso_unexpected. The motion compensation and filtering block 304 may be enabled to reduce the generation of interpolated pictures when the generated cut-off value, rim_unexpected is below an entry threshold value and/or above an exit threshold value.

In accordance with an embodiment of the invention, a reduced interpolation mode may be utilized to interpolate lesser frames in cases where auto shut-off may seem abrupt. For example, when a 3:2 pulldown sequence is input, 4 out of 5 frames may be interpolated. In a reduced interpolation mode, 2 out of 5 frames may be interpolated, for example, to reduce the artifacts. A different value of fract may be utilized for each phase of the 3:2 pulldown. A frame control FIFO may be enabled to communicate either two fract values to select from the motion compensation and filtering block 304, or the frame control FIFO may be enabled to select the fract value.

A histogram may be generated over a frame comprising a plurality of threshold values similar to Table 1 as the fract value may be set for each frame. The registers block 314 may be enabled to store the plurality of threshold values. The cut-off value, rim_unexpected may be generated according to the following equation:

$$\text{rim\_unexpected} = \text{Bin0} + 2*\text{Bin1} + 4*\text{Bin2} + 8*\text{Bin3} + 16*\text{Bin4}$$

The generated cut-off value, rim_unexpected may be compared to an entry threshold value, RIM_ENTER_THRESH 802 to determine whether to utilize the reduced interpolation mode of operation. Similarly, the generated cut-off value, rim_unexpected may be compared to an exit threshold value, RIM_EXIT_THRESH 804 to determine whether to utilize the reduced interpolation mode of operation and to allow for hysteresis.

The reduced interpolation mode may be utilized when the generated cut-off value, rim_unexpected is either less than the entry threshold value, RIM_ENTER_THRESH 802 and/or above the exit threshold value, RIM_EXIT_THRESH 804.

In the reduced interpolation mode of operation, the frame control FIFO may communicate the corresponding fract value to the motion compensation and filtering block 304. A secondary set of register or threshold values, for example, RIM_AINC4_THRESH, RIM_AINC2_THRESH, RIM_AINC1_THRESH, RIM_ADEC1_THRESH, RIM_ADEC2_THRESH, RIM_ADEC4_THRESH, RIM_ADEC8_THRESH, RIM_ADEC16_THRESH and RIM_ADEC32_THRESH may be utilized to update the shut-off value, aso_alpha in order to prevent the shut-off value, aso_alpha from shutting off interpolation in the reduced interpolation mode of operation.

Figure 9:
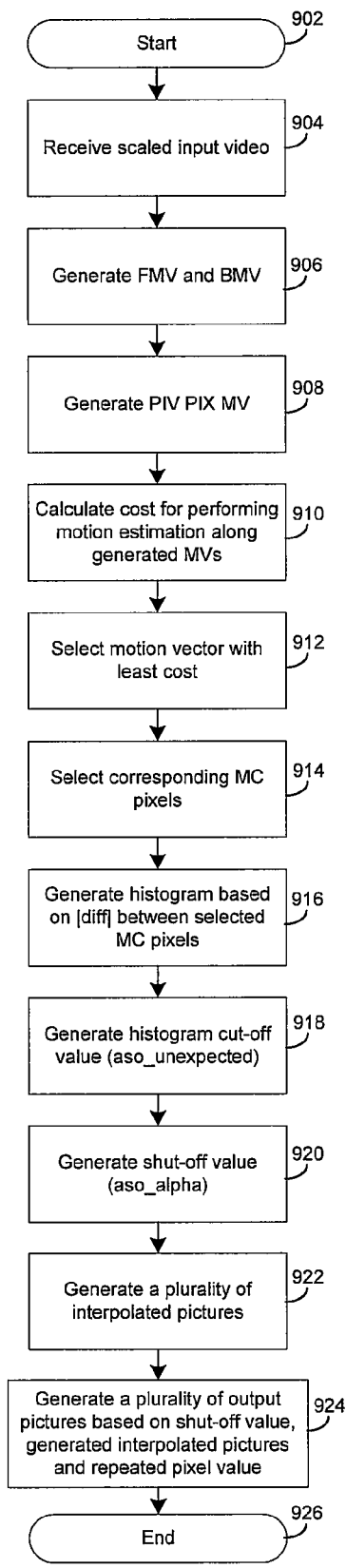
FIG. 9 is a flowchart illustrating exemplary steps for automatically turning off motion compensation when motion vectors are inaccurate, in accordance with an embodiment of the invention.

FIG. 9 is a flowchart illustrating exemplary steps for automatically turning off motion compensation when motion vectors are inaccurate, in accordance with an embodiment of the invention. Referring to FIG. 9, exemplary steps may begin at step 902. In step 904, a plurality of scaled video pictures may be received. In step 906, a plurality of forward and backward motion vectors, FSL0 MV, BSL0 MV may be generated corresponding to a particular block or pixel of received input video pictures. In step 908, a pivot pixel motion vector PIVPIX MV may be generated. In step 910, the corresponding costs associated with performing motion compensation of the particular block or pixel along the generated motion vectors FSL0 cost, BSL0 cost and PIVPIX cost respectively may be calculated. In step 912, a motion vector may be selected from the plurality of generated forward, backward and pivot pixel motion vectors FSL0 MV, BSL0 MV and PIVPIX MV respectively based on the least calculated cost of performing motion compensation along each of the plurality of generated motion vectors.

In step 914, a plurality of motion compensated pixels, MC1 and MC2 corresponding to the selected motion vector may be selected. In step 916, a histogram may be generated over a particular number of pixels comprising a plurality of threshold values based on the calculated difference, |diff| between the selected plurality of motion compensated pixels, MC1 and MC2. In step 918, a histogram cut-off value, aso_unexpected may be generated based on a comparison of the calculated difference |diff| between the selected plurality of motion compensated pixels, MC1 and MC2 with one or more histogram cut-off threshold values. In step 920, a shut-off value, aso_alpha may be generated based on comparison of the generated histogram cut-off value, aso_unexpected with one or more cut-off threshold values. In step 922, a plurality of interpolated pictures may be generated based on the calculated difference between the selected plurality of motion compensated pixels.

In step 924, a plurality of output pictures may be generated based on filtering the generated shut-off value, aso_alpha, the generated plurality of interpolated pictures and a repeated pixel value, rep_pel. A cut-off value, rim_unexpected may be generated based on the generated histogram. Control then passes to end step 926.

In accordance with an embodiment of the invention, a method and system for automatically turning off motion compensation when motion vectors are inaccurate may comprise an output interpolation block 210 that may be enabled to determine the quality of a plurality of generated motion vectors, for example, forward, backward and pivot pixel motion vectors FSL0 MV, BSL0 MV and PIVPIX MV respectively. The output interpolation block 210 may be enabled to control the interpolation of a plurality of output pictures based on the determined quality. The output interpolation block 210 may be enabled to interpolate a plurality of original input pictures when the determined quality of the plurality of generated motion vectors is below a threshold value. The output interpolation block 210 may be enabled to interpolate a plurality of motion compensated pictures when the determined quality of the plurality of generated motion vectors is above a threshold value.

The motion vector selection block 302 may be enabled to receive the generated forward, backward and pivot pixel motion vectors FSL0 MV, BSL0 MV and PIVPIX MV respectively and the corresponding costs associated with performing motion compensation of a particular block or pixel along the generated motion vectors FSL0 cost, BSL0 cost and PIVPIX cost respectively. The motion vector selection block 302 may be enabled to select a motion vector from the plurality of generated forward, backward and pivot pixel motion vectors FSL0 MV, BSL0 MV and PIVPIX MV respectively based on the least calculated cost of performing motion compensation along each of the plurality of generated motion vectors.

The motion compensation and filtering block 304 may be enabled to select a plurality of motion compensated pixels, MC1 and MC2 corresponding to the selected motion vector. The motion compensation and filtering block 304 may be enabled to generate a plurality of interpolated pictures based on a calculated difference between the selected plurality of motion compensated pixels.

The auto shut-off block 308 may be enabled to generate a histogram over a particular number of pixels comprising a plurality of threshold values based on the calculated difference, |diff| between the selected plurality of motion compensated pixels, MC1 and MC2 to determine the quality of the generated plurality of motion vectors. The plurality of threshold values may be adjusted or programmed based on the calculated difference between the selected plurality of motion compensated pixels, MC1 and MC2. The auto shut-off block 308 may be enabled to generate a histogram cut-off value, aso_unexpected based on the generated histogram.

The histogram cut-off value, aso_unexpected may be generated based on comparison of the calculated difference |diff| between the selected plurality of motion compensated pixels, MC1 and MC2 with one or more histogram cut-off threshold values. A shut-off value, aso_alpha may be generated based on comparison of the generated histogram cut-off value, aso_unexpected with one or more cut-off threshold values to control the interpolation of the plurality of output pictures.

The motion compensation and filtering block 304 may be enabled to generate a plurality of output pictures based on filtering the generated shut-off value, aso_alpha, the generated plurality of interpolated pictures and a repeated pixel value, rep_pel. The repeated pixel value, rep_pel may be equal to the non-motion compensated pixel, PIX_A 614 from the previous picture P1 602 when a distance or fract value k between the previous picture P1 602 and the generated interpolated picture 606 is less than a fractional threshold value, for example, k<0.5. The generated repeated pixel value, rep_pel may be equal to a non-motion compensated pixel, PIX_B 616 from the next picture P2 604 when a distance or fract value k between the previous picture P1 602 and the generated interpolated picture 606 is not less than the fractional threshold value, for example, k≧0.5.

A cut-off value, rim_unexpected may be generated based on the generated histogram. The reduced interpolation mode may be utilized when the generated cut-off value, rim_unexpected is either less than the entry threshold value, RIM_ENTER_THRESH 802 and/or above the exit threshold value, RIM_EXIT_THRESH 804. In a reduced interpolation mode, only a subset of the plurality of motion compensated pictures may be interpolated. For example, only 2 out 5 or 3 out of 5 motion compensated pictures may be interpolated when the generated cut-off value, rim_unexpected is either less than the entry threshold value, RIM_ENTER_THRESH 802 and/or above the exit threshold value, RIM_EXIT_THRESH 804 compared to interpolating 4 out 5 pictures for conversion from 24 Hz to 60 Hz, when the generated cut-off value, rim_unexpected is more than the entry threshold value, RIM_ENTER_THRESH 802 and/or below the exit threshold value, RIM_EXIT_THRESH 804. In another embodiment of the invention, in a reduced interpolation mode, time may be warped around each source frame to minimize motion compensated displacement around original source frames.

Another embodiment of the invention may provide a machine-readable storage, having stored thereon, a computer program having at least one code section executable by a machine, thereby causing the machine to perform the steps as described herein for automatically turning off motion compensation when motion vectors are inaccurate.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein. The present invention may be realized in hardware that comprises a portion of an integrated circuit that also performs other functions.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing video data, the method comprising:
    determining quality of a plurality of generated motion vectors to decide whether to turn on or off motion compensation, said determining comprising:
        selecting a motion vector from said plurality of generated motion vectors based on a calculated cost for performing motion compensation along each of said plurality of generated motion vectors;
        selecting a plurality of motion compensated pixels corresponding to said selected motion vector;
        generating a histogram comprising a plurality of threshold values based on a calculated difference between said selected plurality of motion compensated pixels to determine said quality of said plurality of generated motion vectors;
    controlling interpolation based on said determined quality; and
    generating a plurality of output pictures based on said determined quality.

2. The method according to claim 1, comprising interpolating a plurality of input pictures when said determined quality of said plurality of generated motion vectors is below a threshold value.

3. The method according to claim 1, comprising interpolating a plurality of motion compensated pictures when said determined quality of said plurality of generated motion vectors is above a threshold value.

4. The method according to claim 1, wherein said generated motion vectors comprises one or more of:
    forward motion vectors, backward motion vectors and/or pivot pixel motion vectors corresponding to each pixel in said plurality of output pictures.

5. The method according to claim 1, comprising adjusting said plurality of threshold values based on said calculated difference between said selected plurality of motion compensated pixels.

6. The method according to claim 5, comprising generating a shut-off value based on comparison of a generated histogram cut-off value with one or more cut-off threshold values to control said interpolation.

7. The method according to claim 6, comprising generating a plurality of motion compensated interpolated pictures based on said calculated difference between said selected plurality of motion compensated pixels and generating said plurality of output pictures based on filtering said generated shut-off value, said interpolated plurality of motion compensated pictures and a repeated pixel value.

8. The method according to claim 7, wherein said repeated pixel value is equal to a non-motion compensated pixel from a previous input picture when a distance between said previous input picture and one or more of said interpolated plurality of motion compensated pictures is less than a fractional threshold value.

9. The method according to claim 7, wherein said repeated pixel value is equal to a non-motion compensated pixel from a next input picture when a distance between said previous input picture and one or more of said interpolated plurality of motion compensated pictures is not less than said fractional threshold value.

10. The method according to claim 1, comprising generating a cut-off value based on said generated histogram.

11. The method according to claim 10, comprising interpolating a subset of said plurality of motion compensated pictures when said generated cut-off value is below an entry threshold value and/or above an exit threshold value.

12. A system for processing video data, the system comprising:
one or more circuits that enables determination of quality of a plurality of generated motion vectors to decide whether to turn on or off motion compensation;
said one or more circuits enables said determination of quality by:
selecting of a motion vector from said plurality of generated motion vectors based on a calculated cost for performing motion compensation along each of said plurality of generated motion vectors;
selecting a plurality of motion compensated pixels corresponding to said selected motion vector;
generating a histogram comprising a plurality of threshold values based on a calculated difference between said selected plurality of motion compensated pixels to determine said quality of said plurality of generated motion vectors;
controlling interpolation based on said determined quality; and
said one or more circuits enables generation of a plurality of output pictures based on said determined quality.

13. The system according to claim 12, wherein said one or more circuits enables interpolation of a plurality of input pictures when said determined quality of said plurality of generated motion vectors is below a threshold value.

14. The system according to claim 12, wherein said one or more circuits enables interpolation of a plurality of motion compensated pictures when said determined quality of said plurality of generated motion vectors is above a threshold value.

15. The system according to claim 12, wherein said generated motion vectors comprises one or more of: forward motion vectors, backward motion vectors and/or pivot pixel motion vectors corresponding to each pixel in said plurality of output pictures.

16. The system according to claim 12, wherein said one or more circuits enables generation of a shut-off value based on comparison of a generated histogram cut-off value with one or more cut-off threshold values to control said interpolation.

17. The system according to claim 16, wherein said one or more circuits enables generation of a plurality of motion compensated interpolated pictures based on said calculated difference between said selected plurality of motion compensated pixels and generation of said plurality of output pictures based on filtering said generated shut-off value, said interpolated plurality of motion compensated pictures and a repeated pixel value.

18. The system according to claim 12, wherein said one or more circuits enables generation of a cut-off value based on said generated histogram.

19. The system according to claim 18, wherein said one or more circuits enables interpolation of a subset of said plurality of motion compensated pictures when said generated cut-off value is below an entry threshold value and/or above an exit threshold value.

* * * * *